(12) United States Patent
Yamaoka et al.

(10) Patent No.: US 8,793,886 B2
(45) Date of Patent: Aug. 5, 2014

(54) POWER TOOL WITH A ROTATABLE WORKING HEAD

(75) Inventors: Toshinari Yamaoka, Nanjing (CN); Haishen Xu, Nanjing (CN)

(73) Assignee: Chervon Limited, Wanchai (HK)

( * ) Notice: Subject to any disclaimer, the term of this patent is extended or adjusted under 35 U.S.C. 154(b) by 630 days.

(21) Appl. No.: 12/589,326

(22) Filed: Oct. 22, 2009

(65) Prior Publication Data

US 2010/0101096 A1    Apr. 29, 2010

(30) Foreign Application Priority Data

Oct. 27, 2008   (CN) .......................... 2008 1 0234646

(51) Int. Cl.
*B23D 51/01* (2006.01)
(52) U.S. Cl.
USPC ............................... 30/517; 30/296.1; 30/340
(58) Field of Classification Search
CPC ................................... A01G 3/00; A01G 3/06
USPC ............... 30/296.1, 199, 208, 321, 381, 386, 30/275.4, 383, 205, 210, 340, 342, 517, 30/392; 173/216, 217; 403/84
See application file for complete search history.

(56) References Cited

U.S. PATENT DOCUMENTS

| | | | | |
|---|---|---|---|---|
| 1,379,880 A | * | 5/1921 | Seaborn | 433/130 |
| 2,703,928 A | * | 3/1955 | Southwick | 30/386 |
| 4,202,068 A | * | 5/1980 | Lester et al. | 15/28 |
| 4,505,040 A | * | 3/1985 | Everts | 30/296.1 |
| 4,760,646 A | * | 8/1988 | Siegler | 30/382 |
| 4,916,818 A | * | 4/1990 | Panek | 30/383 |
| D361,481 S | * | 8/1995 | Rees et al. | D8/8 |
| 5,926,961 A | * | 7/1999 | Uhl | 30/296.1 |
| 6,488,511 B1 | * | 12/2002 | Stewart | 439/32 |
| 6,651,347 B2 | * | 11/2003 | Uhl | 30/383 |
| 7,191,677 B2 | * | 3/2007 | Barkdoll | 74/396 |
| 7,484,300 B2 | * | 2/2009 | King et al. | 30/296.1 |
| 7,752,760 B2 | * | 7/2010 | Baskar et al. | 30/517 |
| 7,814,816 B2 | * | 10/2010 | Alberti et al. | 81/57.13 |
| 8,024,995 B2 | * | 9/2011 | Dayton et al. | 81/52 |
| 2002/0194739 A1 | * | 12/2002 | Krane et al. | 30/296.1 |
| 2006/0096770 A1 | * | 5/2006 | Roberts | 173/217 |
| 2007/0000138 A1 | | 1/2007 | Baskar et al. | |
| 2010/0126029 A1 | * | 5/2010 | Peterson | 30/519 |

FOREIGN PATENT DOCUMENTS

EP    DP 1 627 562          2/2006
JP          2004357580 A  * 12/2004  ............... A01G 3/04

* cited by examiner

*Primary Examiner* — Kenneth E. Peterson
*Assistant Examiner* — Jennifer Swinney
(74) *Attorney, Agent, or Firm* — McDermott Will & Emery LLP

(57) ABSTRACT

A power tool according to the present invention comprising a working head including a working element, the working head is mounted on a first shaft with a first axis and can be rotated about the first axis, a gripping part, an adjusting mechanism connected between the working head and the gripping part, wherein the adjusting mechanism comprises at least a first transmission element and a second transmission element which are engaged with each other, the first transmission element is connected fixedly to the working head and mounted on the first shaft, the second transmission element is mounted on a hollow rod with an axis, the hollow rod can be rotated relative to the gripping part, a lock for collectively locking the angular position of the working head mounted on the hollow rod. The arrangement simplifies the structure of the power tool, while facilitating the adjusting operation. The user only needs to rotate the gripping part to adjust the trimming angular position without changing the original operation posture.

15 Claims, 4 Drawing Sheets

POWER TOOL WITH A ROTATABLE WORKING HEAD

CROSS-REFERENCE TO RELATED APPLICATIONS

This application claims priority under 35 U.S.C. §119 to CN 200810234646.0 filed Oct. 27, 2008, and is hereby incorporated by reference.

FEDERALLY SPONSORED RESEARCH OR DEVELOPMENT

Not Applicable.

TECHNICAL FIELD

The present invention relates to a power tool, and more particularly, to a power tool with a rotatable working head.

BACKGROUND OF THE INVENTION

A power tool should be designed to satisfy a user's different requirements. In many working conditions, it is desired that the power tool has a rotatable working head to deal with different shaped objects and all the surfaces of an object. The type of power tool may vary, and include garden tools, cleaning tools, etc.

Take the case of garden tools, a hedge trimmer is a commonly used garden tool, which is used to trim bushes or hedges to maintain a beautiful shape. When trimming tall branches, people usually use a hedge trimmer with an extension pole. Compared with an ordinary hedge trimmer, the user does not need a ladder to trim the side surfaces of the tall braches if the user is using the extension hedge trimmer. However, when trimming the top and bottom of the tall trees, the user has to climb to the top of the ladder and bend over to view the bottom of the tree, which is difficult and troublesome. For solving the problem, an extension hedge trimmer with a rotatable working head is designed in the prior art. U.S. Patent Application Publication No. 2007/0000138 discloses this kind of hedge trimmer. A power head of the hedge trimmer comprises a stator cartridge. A head support rotates about the stator cartridge and is engaged by way of a movable engagement pin that is received within a selected recess defined in the stator cartridge. When a user needs to adjust the angular position of the power head, the user must hold a latch in the disengagement position using one hand, and rotate the power head using another hand. After the power head is rotated to the desired angular position relative to the head support and a handle, the latch is released to lock the power head at the angular position.

The hedge trimmer described above solves the problems with trimming the top and bottom of tall trees, but it also has disadvantages. For example, the angle adjusting structure is complicated and has an increased manufacture cost. In addition, the adjusting method is inconvenient. During the adjusting operation, the user moves and holds the latch in the disengagement position while rotating the power head to adjust its angular position. The power head comprises a motor and a transmission therein, so the weight of the power head may make it difficult if the user is rotating the power head with only one hand.

SUMMARY OF THE INVENTION

A power tool according to the present invention comprising a working head including a working element, the working head is mounted on a first shaft with a first axis and can be rotated about the first axis, a gripping part, an adjusting mechanism connected between the working head and the gripping part, wherein the adjusting mechanism comprises at least a first transmission element and a second transmission element which are engaged with each other, the first transmission element is connected fixedly to the working head and mounted on the first shaft, the second transmission element is mounted on a hollow rod with an axis, the hollow rod can be rotated relative to the gripping part, a locking means for collectively locking the angular position of the working head mounted on the hollow rod.

This arrangement simplifies the structure of the power tool, while facilitating the adjusting operation. Compared to known power tools, the user does not need to change the original position when adjusting the trimming angle. The user only needs to rotate the gripping part to realize the adjustment, which is convenient.

BRIEF DESCRIPTION OF THE DRAWINGS

The present invention will become apparent from the following detailed description of the preferred embodiment of the invention illustrated in the accompanying drawings, wherein.

DETAILED DESCRIPTION

Figure 1:
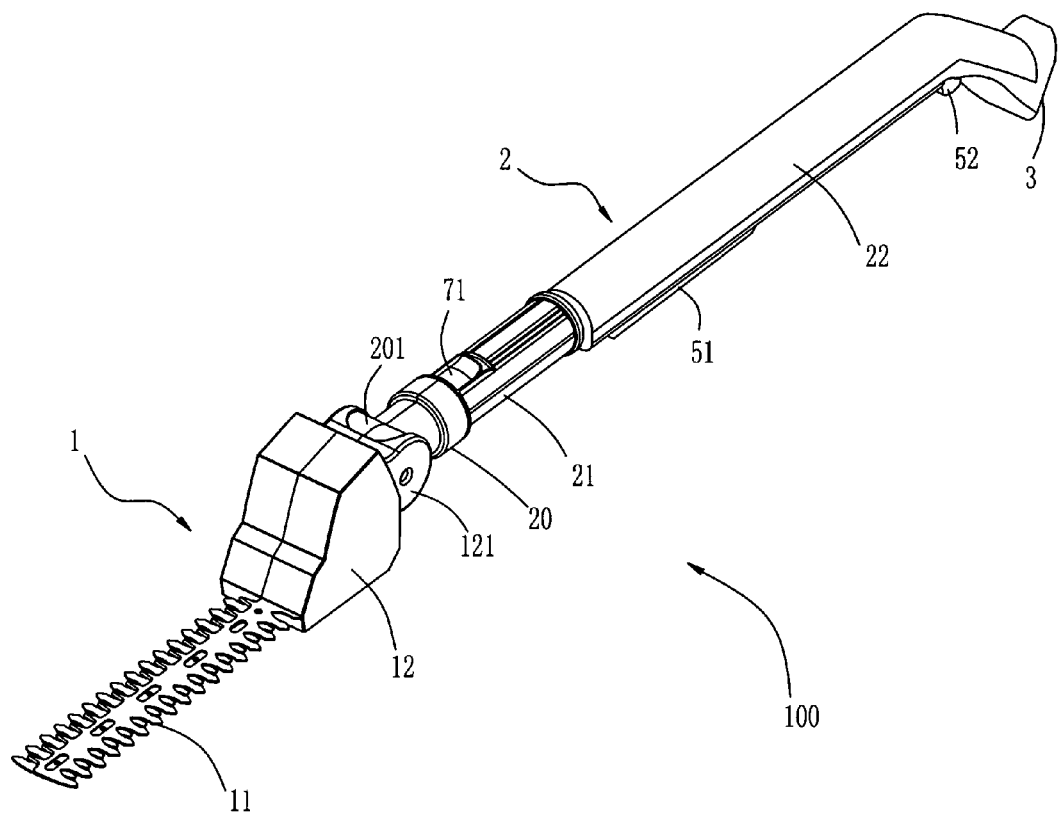
FIG. 1 is a perspective view of a power tool of one embodiment according to the present invention.
Figure 3:
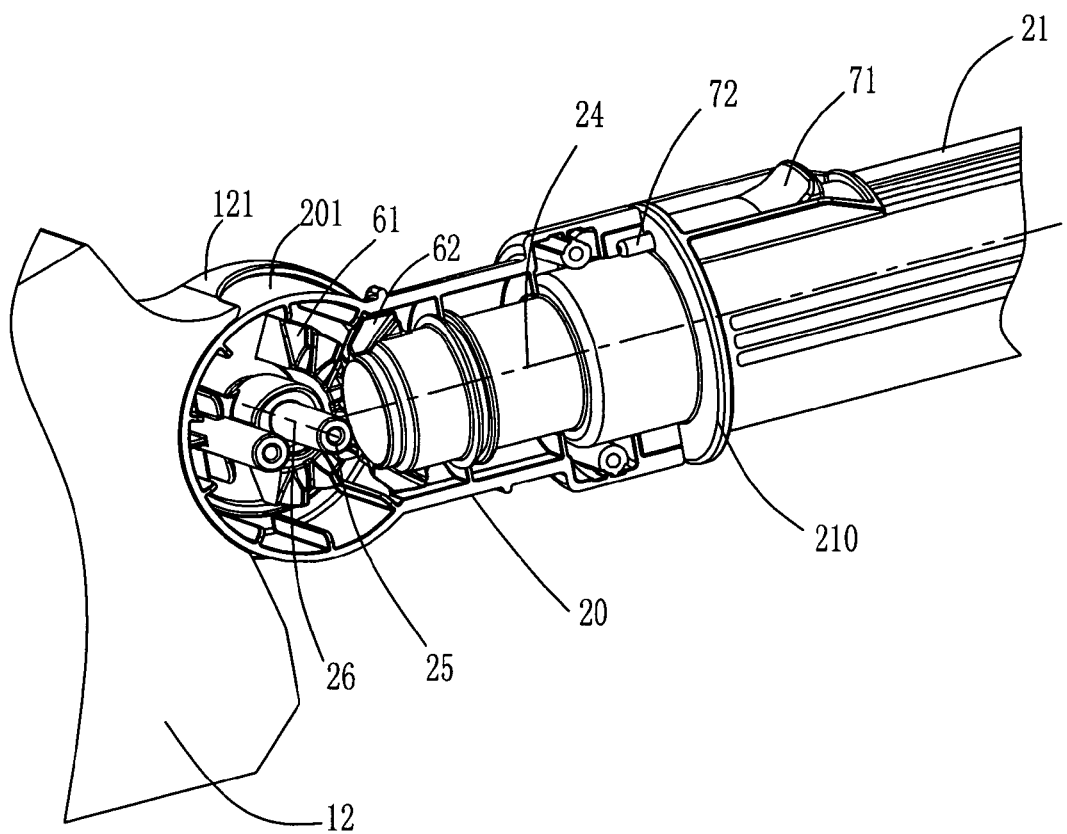
FIG. 3 is a perspective view showing the structure of the power tool, wherein the second shaft is removed for clarity.

With reference to FIGS. 1 and 3, a preferred embodiment of the present invention is shown. In the preferred embodiment, a power tool is embodied as a hedge trimmer 100. The hedge trimmer 100 comprises a working head 1, a pole part 2 and a power source 3. The working head 1 comprises a working element 11 and a driving part 12. In the present embodiment, the working element 11 is a pair of trimming blades. The driving part 12 includes a motor mounted therein for driving the blades 11. The working head 1 is mounted on a first shaft 25 with a first axis 26, and can be rotated about the first axis 26. The pole part 2 is connected with the working head 1 for supporting the working head 1, so that the hedge trimmer 100 can trim tall trees. The pole part 2 comprises a connection rod 20, a hollow rod 21 and a gripping part 22. The gripping part 22 is connected with the power source 3 on its free end. In the present embodiment, the power source 3 is a battery pack for power supplying the driving part 12. However, the power source of the present invention is not limited to the battery pack, which may provide AC power. In other embodiments, the driving part 12 may include a combustion engine instead of the motor. The gripping part 22 is an elongated pole, the end of which is designed with a bend to comply with ergonomics, to allow the user additional comfort while gripping. The gripping part 22 includes a first switch 51 and a second switch 52. Wherein, the first switch 51 is adjacent to the front end of the gripping part 22, and the second switch 52 is adjacent to the rear end of the gripping part 22. The arrangement of the first and second switches 51, 52 is adapted to be operated with two handles, so that the operation is convenient. The first switch 51 is interlocked with the second switch 52, so that the motor is actuated only when the two switches are turned on.

Figure 2:
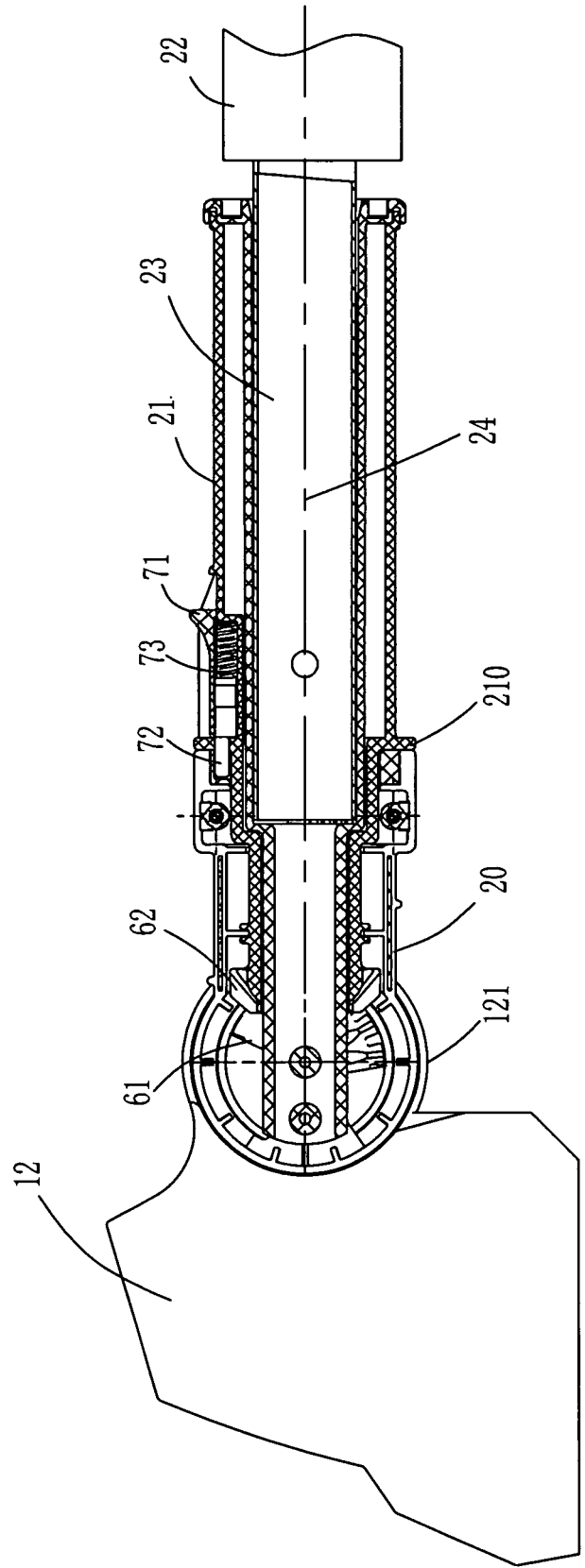
FIG. 2 is a sectional view of the pole of the power tool.

With reference to FIGS. 1 and 2, FIG. 2 is a sectional view of the pole part 2. The pole part 2 comprises a second shaft 23 with a second axis 24. The second shaft 23 passes the hollow rod 21, the two ends of which are respectively extended into the connection rod 20 and the gripping part 22. One end of the second shaft 23 is fixedly connected with the connection rod 20 through the first shaft 25; the other end is fixed circumferentially within the gripping part 22. The hollow rod 21 is coaxial with the connection rod 20 and the second shaft 23, which can be rotated about the second axis 24 relative to the connection rod 20 and the second shaft 23. The front end of the hollow rod 21 is extended into the connection rod 20. In another embodiment, the gripping part 22 can be moved axially relative to the second shaft 23 so as to adjust the length of the pole part 2 in order to trim taller trees.

With reference to FIGS. 2 and 3, the second shaft 23 is removed in FIG. 3 for clarity. The driving part 12 comprises a first cylindrical housing 121 at its rear end. Correspondingly, a second cylindrical housing 201 is formed on the front end of the connection rod 20. The second cylindrical housing 201 is disposed within the first cylindrical housing 121 and can be rotated relative to it. The working head 1 is connected with the connection rod 20 through the engagement of the first and second cylindrical housing 121, 201. An adjusting mechanism for adjusting the angle between the working head 1 and the pole part 2 is mounted within the first and second cylindrical housing 121, 201. The adjusting mechanism comprises a first transmission element and a second transmission element. In the present embodiment, the first transmission element is a first conical gear 61, and the second transmission element is a second conical gear 62. The first conical gear 61 is engaged with the second conical gear 62. Preferably, the first and second conical gear 61, 62 are half of a conical gear. This structure can satisfy the angular adjustment of the working head 1, while saving in manufacture costs, and decreasing the weight of the hedge trimmer. In other embodiments, the first and second conical gear may be whole conical gears. The first conical gear 61 is mounted on the first shaft 25 and connected fixedly with the first cylindrical housing 121. Thereby, the first conical gear 61 is connected fixedly to the working head 1. The second conical gear 62 is mounted fixedly on the front end of the hollow rod 21. In the present embodiment, the first axis 26 of the first shaft 25 is perpendicular to the second axis 24 of the second shaft 23. Alternatively, in other embodiments, the first axis 26 may be at other angle relative to the second axis 24, and the angle is not limited to 90°. When the second conical gear 62 is rotated about the second axis 24, it drives the first conical gear 61 and the working head 1 rotating about the first axis 26 relative to the pole part 2, so as to adjust the angle of the working head 1 relative to the pole part 2. During the adjustment, the hollow rod 21 which is connected fixedly with the second conical gear 62 is rotated relative the connection rod 20.

Figure 4:
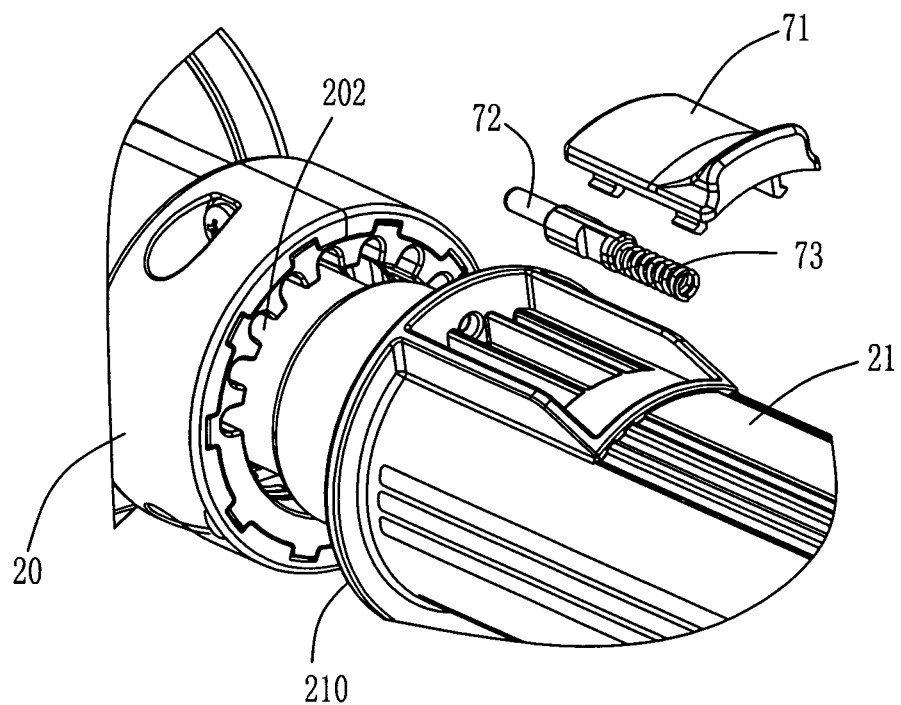
FIG. 4 is an exploded view of the power tool.

With reference to FIGS. 3 and 4, a locking means is mounted on the hollow rod 21 for collectively locking the angular position of the working head 1. The locking means comprises a locking button 71. A locking pin 72 is connected fixedly to the bottom of the locking button 71. Alternatively, the locking pin 72 may be integrated with the locking button 71. The locking pin 72 is mounted on the hollow rod 21 through the use of a biasing element. In the present invention, the biasing element is a spring 73. Referring to FIG. 3, the rear end of the connection rod 20 is in close contact with a shoulder 210 of the hollow rod 21. FIG. 4 is an exploded view of the connection rod 20 and the hollow rod 21. Referring to FIG. 4, a series of recesses 202 are formed on the rear end of the connection rod 20, and the locking pin 72 can be engaged collectively with any one recess 202. When the locking pin 72 is located in the recess 202, the angular position of the working head 1 relative to the pole part 2 is locked. The spring 72 presses a biasing force on the locking pin 72, so when the locking pin 72 reaches a position facing the recess 202, it is pressed in to the recess 202 by the biasing force. When the locking pin 72 is moved backward against the biasing force of the spring 73 to disengage the recess 202 by moving the locking button 71 backward, the angle of the working head 1 can be adjusted. In other embodiments, the biasing element may be mounted on the locking button 71 and therefore, directly presses a biasing force on the locking button 71 to drive the locking pin 72 to move. The arrangement of the recesses 202 is corresponding to the angle of the working head 1. In the present embodiment, the working head 1 can be adjusted to 0°, 20°, 40°, 60°, −18.75°, −37.5°, −56.25° and −75° relative to the pole part 2. In other embodiments, other appropriate locking means with different structures may be used, and the working head may be locked at other desired angular positions.

When it is desired to adjust the trimming angle of the working head 1, the user grips the hollow rod 21 with one hand, and grips the gripping part 22 with another hand, then actuates the locking means to move the locking button 71 backward using the thumb of the hand gripping the hollow rod 21 to disengage the locking pin 72 from the recess 202 against the biasing force of the spring 73. Finally the user rotates the hollow rod 21 to make the second conical gear 62 rotate together. The working head 1 is rotated about the first axis 26 relative to the pole part 2 through the engagement between the first and second conical gear 61, 62. Thus the angle of the working head 1 is adjusted. Alternatively, another adjusting operation method may be used. The user grips and retains the hollow rod 21 with one hand, and grips the gripping part 22 with another hand, then actuates the locking means to move the locking button 71 backward using the thumb of the hand gripping the hollow rod 21. Finally the user rotates the gripping part 22 with another hand to drive the second shaft 23 and the first shaft 25 rotate about the second axis 24. Because the first conical gear 61 is mounted on the first shaft 25, an interaction force is generated between the first and second conical gear 61, 62 when the first conical gear 61 and the first shaft 25 together rotate about the second axis 24. In the case that the second conical gear 62 is not rotated, the first conical gear 61 rotates about the first axis 26 and drives the working head to rotate. When the working head 1 is rotated to the desired angular position, the locking button 71 is released and the locking pin 72 moves forward under the biasing force. The locking pin 72 is engaged with the recess 202 on the rear end of the connection rod 20, so as to lock the working head 1 at the desired angular position.

Those skilled in the art will realize that the present invention may be used to other power tools, the working head of which is needed to rotate.

The present invention is not restricted as the embodiments disclosed herein above. For example, the power supply of the power tool and the angle position of the working head are not limited to the embodiments above. Otherwise, the adjusting mechanism may be instead of belt transmission. Accordingly, any substitutes and modifications according to the spirit of the present invention will be regarded as falling within the claims appended hereto.

What is claimed is:
1. A power tool comprising:
 a working head including a working element, the working head mounted to a first shaft with a first axis, the working element being rotatable about the first axis;

a gripping part;

an adjusting mechanism connected between the working head and the gripping part;

wherein the adjusting mechanism comprises at least a first transmission element rotatable relative to a second transmission element which are engaged with each other, the first transmission element being connected to the working head and mounted on the first shaft, the second transmission element being mounted on a hollow rod with a second axis, the hollow rod being rotatable about the second axis relative to the gripping part to adjust an angle formed between the working head and the gripping part;

a locking means for collectively locking the angular position of the working head mounted on the hollow rod.

2. The power tool of claim 1, wherein the adjusting mechanism includes a conical gear transmission.

3. The power tool of claim 1, wherein the first axis of the first shaft is perpendicular to the second axis of the hollow rod.

4. The power tool of claim 1, wherein a second shaft is fixed circumferentially to the gripping part.

5. The power tool of claim 4, wherein at least a portion of the second shaft is located within the hollow rod.

6. The power tool of claim 4, wherein the hollow rod can be gripped by a user.

7. The power tool of claim 1, wherein the locking means includes a locking button, a locking pin and a biasing element.

8. The power tool of claim 7, wherein a connection rod is disposed between the working head and the hollow rod, the connection rod being fixedly connected to the second shaft.

9. The power tool of claim 8, wherein the working head has first end which is adapted to be connected to the working element and a second end which is adapted to be connected to a first cylindrical housing.

10. The power tool of claim 9, wherein the connection rod has a first end which is adapted to be connected to the working head at a first end, and has a series of recesses at a second end.

11. The power tool of claims 10, wherein the locking pin can be selectively engaged with the recesses at the second end of the connection rod.

12. The power tool of claim 9, wherein the connection rod includes a second cylindrical housing at the first end of the connection rod.

13. The power tool of claim 12, wherein at least one of the first and second cylindrical housings being disposed within the other.

14. The power tool of claim 12, wherein the adjusting mechanism is mounted within the first and second cylindrical housings.

15. The power tool of claim 1, wherein the first and second transmission elements are first and second conical gears which are engaged with each other.

* * * * *